United States Patent
Leichtfried et al.

(10) Patent No.: US 10,060,491 B2
(45) Date of Patent: Aug. 28, 2018

(54) ELEVATOR BRAKE MECHANISM AND/OR SAFETY GEAR WITH WELDED BRAKE LINING

(71) Applicant: Wittur Holding GmbH, Wiedenzhausen (DE)

(72) Inventors: Markus Leichtfried, Lunz am See (AT); Karl Kriener, Viehdorf (AT); René Holzer, Scheibbs (AT); Franz Grubner, St. Georgen an der Leys (AT)

(73) Assignee: Wittur Holding GmbH, Wiedenzhausen (DE)

( * ) Notice: Subject to any disclaimer, the term of this patent is extended or adjusted under 35 U.S.C. 154(b) by 0 days.

(21) Appl. No.: 15/169,398

(22) Filed: May 31, 2016

(65) Prior Publication Data

US 2016/0348745 A1 Dec. 1, 2016

(30) Foreign Application Priority Data

Jun. 1, 2015 (DE) .................... 20 2015 102 837 U

(51) Int. Cl.
| | | |
|---|---|---|
| *F16D 69/00* | (2006.01) | |
| *B66B 5/18* | (2006.01) | |
| *B23K 26/34* | (2014.01) | |
| *B66B 9/00* | (2006.01) | |
| *F16D 69/02* | (2006.01) | |

(Continued)

(52) U.S. Cl.
CPC .............. *F16D 69/00* (2013.01); *B23K 26/34* (2013.01); *B66B 5/18* (2013.01); *B66B 9/00* (2013.01); *F16D 69/02* (2013.01); *F16D 69/027* (2013.01); *F16D 69/04* (2013.01); *B23K 2203/08* (2013.01); *F16D 2069/004* (2013.01);

(Continued)

(58) Field of Classification Search
CPC ........ F16D 69/00; F16D 69/02; F16D 69/027; F16D 69/04; B23K 26/34; B66B 5/18; B66B 5/22; B66B 9/00
See application file for complete search history.

(56) References Cited

U.S. PATENT DOCUMENTS

| | | | | |
|---|---|---|---|---|
| 5,503,257 A | * | 4/1996 | Sugita .................... | B66B 5/18 188/250 B |
| 5,964,320 A | * | 10/1999 | Kato ....................... | B66B 5/22 187/375 |

(Continued)

FOREIGN PATENT DOCUMENTS

| | | |
|---|---|---|
| WO | 2015071188 A1 | 5/2015 |
| WO | 2014035382 A1 | 3/2016 |

*Primary Examiner* — Michael A Riegelman

(57) ABSTRACT

An elevator system with an elevator car, elevator en guide rails, at least one braking rail, and a brake mechanism and/or safety gear that determines the elevator car movement when activated and in turn has at least one brake block that cooperates with the braking rail. The active surface of this brake block that comes into contact with the braking rail functioning as the brake lining is at least one welding bead whose surface hardness is greater than surface hardness of the braking rail. A method for manufacturing such an elevator brake block includes welding at least two welding beads on a brake lining support composed of a weldable, preferably low-alloyed steel, which constitutes the brake lining that is brought into frictional contact with the braking rail during operation.

19 Claims, 4 Drawing Sheets

(51) Int. Cl.
*F16D 69/04* (2006.01)
*B23K 103/08* (2006.01)

(52) U.S. Cl.
CPC ............... *F16D 2069/0458* (2013.01); *F16D 2069/0491* (2013.01)

(56) References Cited

U.S. PATENT DOCUMENTS

| | | | | |
|---|---|---|---|---|
| 5,964,322 | A * | 10/1999 | Thompson | B66B 5/22 188/251 M |
| 5,979,615 | A * | 11/1999 | Thompson | B66B 5/18 188/251 A |
| 6,371,261 | B1 * | 4/2002 | Thompson | B66B 5/22 187/370 |
| 6,668,985 | B2 * | 12/2003 | Krenkel | F16D 69/023 188/251 A |
| 9,586,792 | B2 * | 3/2017 | Shiraishi | B66B 5/22 |
| 2004/0040795 | A1 * | 3/2004 | Nowak | F16D 65/0037 188/71.1 |
| 2015/0083533 | A1 * | 3/2015 | El-Wardany | B66B 5/22 188/251 A |
| 2015/0292582 | A1 * | 10/2015 | El-Wardany | B66B 5/22 188/250 G |

* cited by examiner

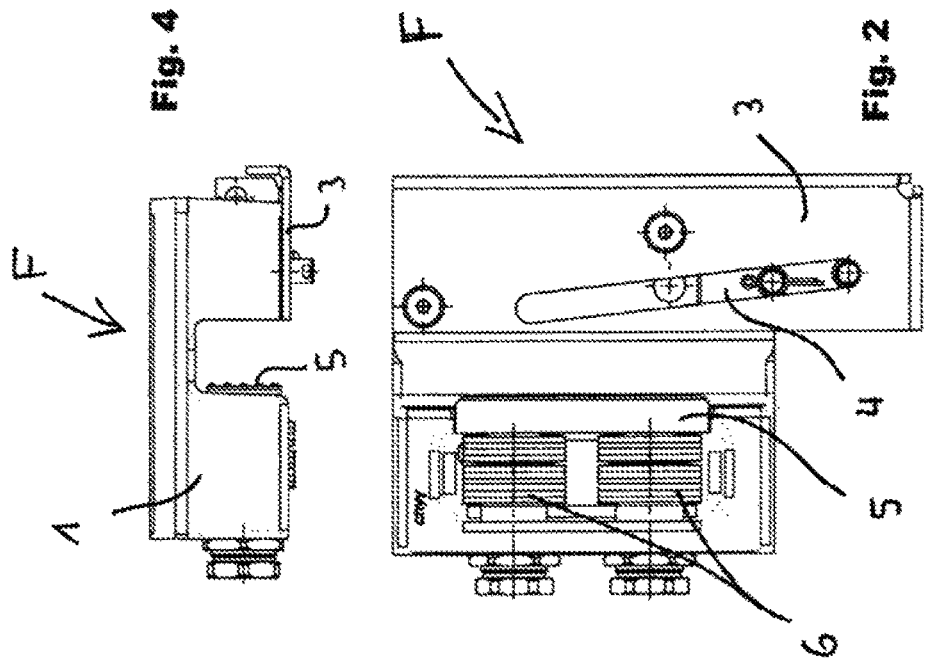
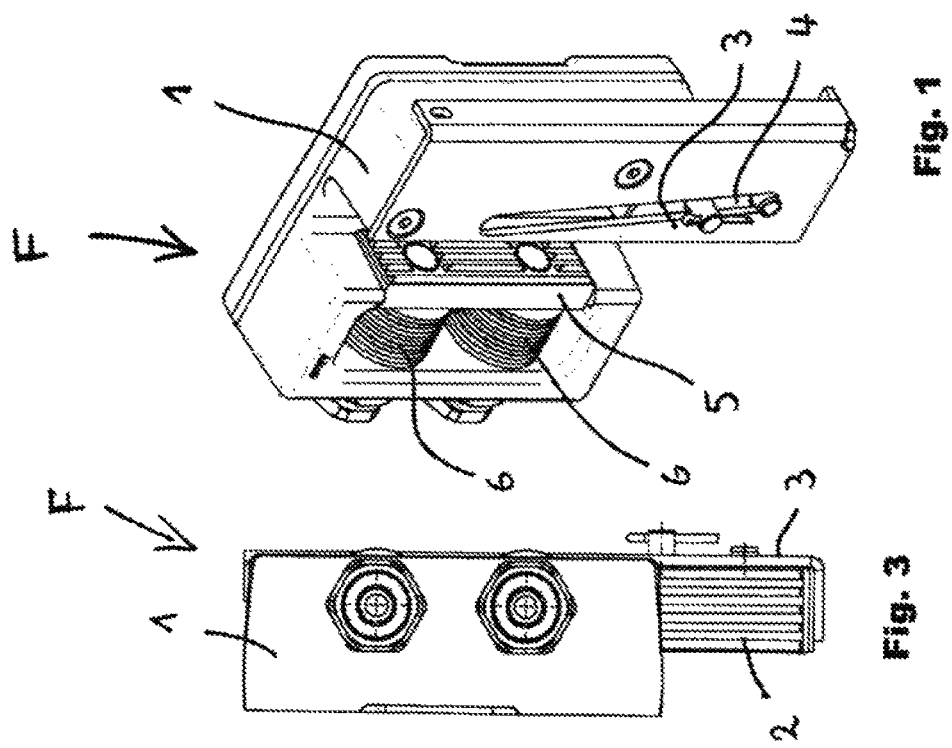

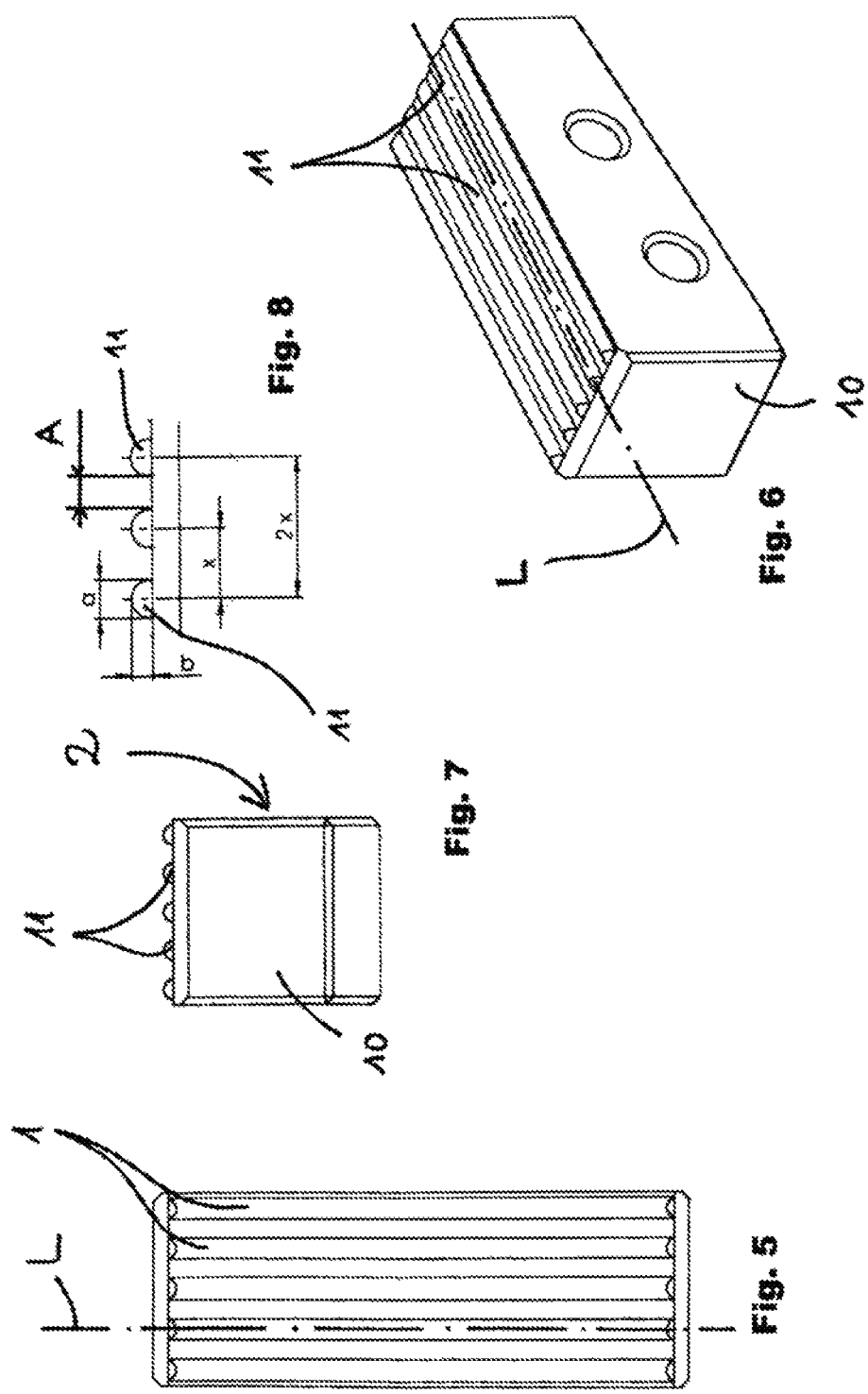

ELEVATOR BRAKE MECHANISM AND/OR SAFETY GEAR WITH WELDED BRAKE LINING

FIELD OF THE INVENTION

The invention relates to an elevator with a progressive safety gear and a method for manufacturing a progressive safety gear for such an elevator.

BACKGROUND OF THE INVENTION

In elevator design, progressive safety gears serve to stop uncontrolled movement states of the elevator car and namely the falling or runaway motion of the elevator car as quickly as possible by bringing the elevator car to a standstill by the shortest possible route, i.e. by "catching" it—so that nothing happens, even if the elevator car is fully loaded and falls or runs away in the vicinity of the shaft pit or shaft head.

A wide variety of progressive safety gears are known. Most progressive safety gears use the principle of self-locking. After the progressive safety gear is triggered, at least one mobile brake block (i.e. an element that directly embodies the brake lining itself or that is connected to a brake lining) is pulled into a wedge-shaped gap, which is usually elastically delimited at one end by a spring element, until it reaches a position in which the maximum permissible brake force is generated.

In recent times, hydraulically actuated progressive safety gears have also been used.

All of these progressive safety gears share the common trait that during the catching operation, very high pressures occur between the brake linings and the guide rails that are assigned to them as "braking rails."

As a result, the brake linings are put under a great deal of stress during the catching operation. Because of this, for the past 50 years and more, steel brake blocks or brake blocks with a steel lining have been used, whose surface that comes into contact with the guide rail is hardened or tempered in order to reduce the wear on the brake block or its brake lining.

It is not uncommon, however, even during the first catching operation, for the influence of the high pressure and the resulting frictional heat to cause instantaneous local cold welding with a subsequent re-separation between the steel surfaces of the brake block or its brake lining and the guide rail. As a result, even after a small number of catching operations, the brake block and/or its brake lining are so severely damaged on their surface provided for coming into contact with the guide rail that they have to be replaced.

The object of the invention, by contrast, is to disclose an elevator with a wear-resistant progressive safety gear.

SUMMARY OF THE INVENTION

This object is attained with an elevator system with an elevator car, elevator car guide rails, and at least one braking rail. Most often, the braking rail is not provided in the form of a separate rail arranged so that it extends along the elevator shaft from the bottom of the shaft to the shaft head; instead, at least one of the guide rails functions as a braking rail. As a rule, a pair of elevator car guide rails constitutes a pair of braking rails.

The elevator system according to the invention is equipped with at least one brake mechanism and/or safety gear that determines the elevator car movement when activated. Preferably, this device is designed among other things so that when an impermissible operating state occurs, the device slows—and most often also stops—the elevator car and in the event of a drop, does so with a deceleration of between 0.2 g and at most 1.5 g with a fully loaded elevator car.

The brake mechanism and/or safety gear has at least one brake block that is intended to cooperate with the braking rail. In this context, the brake block is understood not only in the broadest sense to include box-shaped blocks, but also often includes rollers, for example, that are pulled into an open wedge-shaped gap between the surface of the braking rail and the brake caliper, thus jamming and producing friction that likewise acts in a braking or catching fashion.

According to the invention, the active surface of this brake block that comes into contact with the braking rail (i.e. the actual "brake lining") is at least one welding bead, which is most often produced on the brake lining support by means of surface-layer welding and whose surface hardness is greater than surface hardness of the braking rail.

It has surprisingly turned out that the structure that has a welding bead, specifically during exceptionally "hard" braking operations, is significantly more robust relative to the feared local cold welding and re-separation than the structure of the previously used surface-hardened brake blocks without a depositing of material, which were generally profiled by being provided with a milling before the hardening in order to be able to compensate for the almost inevitable crowning of the guide rails or braking rails. This was unexpected because steel components that are surface hardened through quenching already achieve a high hardness.

In addition, the use of a welding bead produced by means of surface-layer welding as the brake lining has the advantage that it is possible to intentionally select a material for the welding bead that is not suitable for welding the steels used for manufacturing the braking rail or guide rail. Through such a material combination, it is possible from the outset to avoid the cold welding and re-separation or to reduce them to the negligible range. In this connection, even high costs for the material, of which the welding seam is produced are not noticeable to a relevant degree because the percentage of material of the welding bead represents only a fraction of the material that must be used to produce the brake block as a whole.

The term "welding bead" has a preferred narrow meaning, and optionally, in the exceptional case initially included here, a broader meaning.

In its actual, preferred sense, a "welding bead" refers to a line that extends along a longitudinal axis and whose span in the direction of the longitudinal axis is many times greater than its span perpendicular thereto and covers only a fraction of the surface of the substrate onto which it is deposited so that in the direction transverse to the longitudinal axis L, an uncovered surface of the substrate remains.

The fact that the use of such welding beads in the narrower sense ends up solving the problem of the cold welding and re-separation is particularly surprising. This is because the use of such welding beads results in the fact that the brake lining—as compared to conventional large-area brake linings made of a hardened steel profile—comes into contact with an even smaller area of the braking rail/guide rail. As a result, much higher local pressures occur between the brake lining and the braking rail/guide rail. Despite this fact, the occurrence of cold welding and re-separation is practically eliminated.

A welding bead in the broader sense that is not preferred here is a coating that has been produced by means of a plurality of adjacent welding beads, which have parallel longitudinal axes and transition directly into one another and have melted together with one another. A welding head in this sense can predominantly or completely cover the surface of the substrate onto which it is deposited.

BRIEF DESCRIPTION OF THE DRAWINGS

FIG. 1 shows an elevator brake mechanism and safety gear of the kind used for the invention, in a perspective view diagonally from the front.

FIG. 2 shows the device from FIG. 1 from the front.

FIG. 3 shows the device according to FIG. 1 from the side.

FIG. 4 shows the device according to FIG. 1 from above.

FIG. 5 shows a view from above of an exemplary embodiment for the second brake block, which is embodied according to the invention and belongs to the device according to FIG. 1.

FIG. 6 shows the brake block according to FIG. 5, in a perspective view diagonally from the front.

FIG. 7 shows the brake block according to FIG. 5 from the front.

FIG. 8 shows an enlargement of the welding beads that are used for the brake block according to FIG. 5 and the following figures.

DETAILED DESCRIPTION OF THE INVENTION

Figure 10:
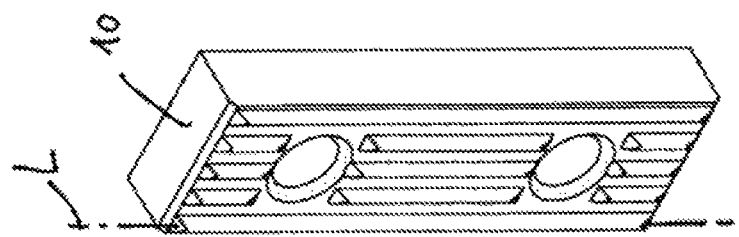
FIG. 10 shows the brake block according to FIG. 9, in a perspective view diagonally from the front.

It is particularly advantageous and thus very preferable for the brake lining of this brake block to be composed of at least two welding beads that are spaced apart from each other and ideally, for it to be composed of three to ten welding beads that are respectively spaced apart from one another in the direction perpendicular to their longitudinal axes.

Welding beads that are truly spaced completely apart from one another in the direction perpendicular to their longitudinal axes between which a surface of the substrate remains uncovered by the welding have proven their value to a particular degree in tests. More detailed testing to determine why this is the case have not yet been conducted. But based on everything that has been observed up to this point, it can be assumed that from the standpoint of structural evolution, it is not advantageous to permit a welding bead to first completely cool and then to melt it partially again and to thus join the closest adjacent welding bead to it.

Preferably, the welding bead has a semicircular, semi-elliptical, or semi-oval cross-section perpendicular to its longitudinal axis.

As a result, the welding bead is embodied so that it only comes into direct contact with the braking rail along a narrow contact line in the vicinity of its apex.

This embodiment has turned out to be generally advantageous. In particular, it is a great advantage if the welding beads are used as a brake lining without having to undergo further machining such as grinding after the welding.

Specifically, it has turned out that with such an embodiment, with the first braking, an increased amount of wear (without cold welding) occurs, which evens out the places on the welding bead—that initially protrude slightly, preventing a uniform contact—until the welding bead then comes into contact with the braking rail along practically its entire apex. As a result, the initial wear levels off significantly. The tests show that after this, the brake lining is able to easily withstand a plurality of—often more than 10—hard braking operations that correspond to a catching operation without exhibiting further relevant wear or even the damage phenomena due to cold welding that are known from experience with prior brake linings.

Preferably, the welding beads are embodied so that they are free of scale.

This means that the welding beads have a circumferential surface, which is continuously smooth viewed macroscopically or with the naked eye, and preferably feature the fact that viewed largely perpendicular to their longitudinal axis, they have the same cross-section, with a deviation of no greater than +/−0.075 mm between two cross-sections when compared to each other.

It has turned out to be particularly advantageous that the surface of the at least one welding bead is not remachined, in particular, is not ground, and preferably has also not been subjected to any subsequent heat treatment.

This prevents alteration to the structure, which has been produced by the welding process and is so advantageous for the invention. This also eliminates the cost of the remachining.

It has turned out to be particularly advantageous if the apex of the welding bead protrudes by more than 0.5 mm, or better still more than 1.5 mm, from the surface of the brake lining support oriented directly at the braking rail. A welding bead that is exposed in this way after the end of the application of welding heat exhibits a cooling behavior that promotes the structural evolution that is desired according to the invention.

Preferably, the welding bead contains a carbide, ideally a tungsten carbide.

Particularly preferably, the welding bead is composed of a carbide that is integrated into an alloy matrix or is composed of a carbide alloy.

It is particularly advantageous if the alloy matrix in turn has a hardness of between 30 HRC and 50 HRC, measured in accordance with DIN EN ISO 6508-1.

Such a brake lining is preferably produced in that a mixture is welded onto it, which mixture is composed of ideally spherical carbide particles—in particular tungsten carbide particles—mixed with the metal particles that constitute the matrix in which the carbide is embedded in the course of the welding procedure.

It has surprisingly turned out that in particular, a carbide not only makes an important contribution to the formation of an extremely hard-wearing brake lining, but also, despite its extreme hardness, does not cause damage to the surface of the guide rails, even with hard braking—which was not expected, especially not with a use in the form of a welding bead (in the narrower sense), which only comes into contact with a small area of the surface of the braking rail or guide rail and with a correspondingly high surface pressure.

In the event that no carbide is to be used, it has turned out to be particularly advantageous if the welding bead is composed of a nickel-based or cobalt-based alloy, preferably in the form of a so-called super alloy. Nickel-based or cobalt-based alloys, as the name suggests, are materials whose main component, respectively, is nickel or cobalt.

In the context of this invention, the term "super alloys" refers to materials that are composed of a nickel-based or cobalt-based alloy and contain several additions of the following alloying elements: Co, Ni, Fe, Cr, Mo, W, Re, Ru, Ta, Nb, Al, Ti, Mn, Zr, C, and B.

In isolated, but not preferred, cases, iron-based alloys and corresponding super alloys are also conceivable.

Typically in the context of the invention, polycrystalline super alloys are used that are highly heat-resistant in that they are able to withstand continuous use temperatures of more than 65% of the melting point.

During use as a brake lining for elevator brake mechanisms and/or safety gears, the surface does not come anywhere near these temperatures, especially not for long periods of time. Therefore, the super alloys that are commonly used for turbine blades and comparable applications are not appropriate here in the context of the invention. It has turned out, however, that the high heat resistance (which has not been properly taken advantage of) significantly reduces the cold welding tendency that is feared in elevator brake mechanisms and safety gears.

According to the invention, these super alloys and also the tungsten carbide mentioned above are preferably used in the form of a powdered metal, which is melted with the aid of a laser beam and thus welded onto the substrate surface, i.e. the surface of the brake lining, support, and fused to it.

Preferably, the welding bead is composed of a material that has at least three different alloying elements, preferably from the above-mentioned list. Elements that are contained in a quantity of less than 0.8 wt % in this case are not alloying, elements that must be taken into account, but impurities.

Welding beads with a high nickel content or with nickel-based alloys have turned out to have a very low susceptibility to cold welding. Consequently, preferred welding beads are those that contain at least 30 wt %, preferably at least 50 wt % of Ni.

Welding beads with a high cobalt content or with cobalt-based alloys have turned out to be similarly good alternatives. They are also not susceptible to cold welding. Consequently, preferred welding beads are those that contain at least 30 wt %, preferably at least 50 wt % of Co.

It has turned out to be particularly advantageous if the material of which the welding bead is composed is also alloyed with molybdenum. As a result, the welding bead contains at least 4 wt % and preferably at least 8 wt % of Mo.

Welding beads that contain at least 2 wt % tungsten (W) have turned out to exhibit a particularly good grip.

A structure that turns out to be particularly favorable for the purpose according to the invention because it is homogeneous is produced if the welding bead is melted from a powder.

In this case, it is particularly advantageous for the structural evolution of the welding bead if it is produced by means of laser surface-layer welding.

The present invention also claims a method for manufacturing an elevator brake block, which features the fact that a brake lining support composed of a weldable steel—which is itself preferably alloyed and ideally low-alloyed—has at least two beads welded onto it that are spaced apart from each other and constitute the brake lining, which is brought into frictional contact with the braking rail during operation.

In this context, the term "low-alloyed" refers to steels in which the sum of the alloying elements does not exceed a content of 5 wt %. In general, steels with a carbon content of 0.2% are weldable.

Also according to the method, it is particularly advantageous if the welding beads are produced by means of laser surface-layer welding using a metal powder.

Protection is also claimed for the use of the above-mentioned materials as a brake lining for an elevator brake mechanism and safety gem.

Other approaches, advantages, and embodiment options ensue from the following discussion of a specific exemplary embodiment in conjunction with the figures.

The Brake Mechanisms and/or Safety Gears

FIGS. 1 through 4 show a typical safety gear in which the novel brake blocks are used.

The safety gear is composed of a brake caliper 1, which is to be mounted on the elevator car and whose middle region forms a gap that accommodates the guide rail, not shown here, which generally functions as a braking rail.

On one side, the brake caliper 1 supports a first brake block 2. This is supported, for example, in a sliding block guide 3 with an obliquely extending gap 4. On the other side, the brake caliper has a second brake block 5. The latter is supported on the brake caliper 1, in a way that is predominantly not rigid, but rather with the aid of at least one spring element 6, namely with the aid of the two packets of disc springs in the present case.

The safety gear is activated by bringing the first brake block 2 into contact with the guide rail. If this occurs, for example when the elevator car is traveling downward, then it is easy to see that the first brake block 2 is therefore yanked upward. The diagonally extending gap 4 is used only for guidance, but the back of the first brake block 2 oriented away from the rail has a wedge bevel that travels along a counterpart wedge bevel that is not shown in the figures. Because of this, under the influence of the friction occurring between its brake lining and the guide rail, the first brake block 2 is pressed more forcefully against the surface of the guide rail, the farther the friction forces drive it into the wedge-shaped gap. This is moderated by the fact that the second brake block 5 is pushed to the side in opposition to the action of the two disc spring packets (which constitute the spring element 6 here), until they reach the end of their compression and then a very high braking force is produced. This avoids an excessively abrupt reaction of the safety gear.

The above manner in which this safety gear functions, however, readily demonstrates that a high pressure is produced between the surface of the guide rail and the surfaces of the brake linings oriented toward it. Because of this, the above-mentioned local cold welding with subsequent re-separation occurs, which very quickly damages the surface of the brake linings.

The Brake Blocks or Brake Linings According to the Invention

Special brake blocks are used in order to remedy this. FIGS. 5 through 8 show the first brake block 2, which as explained above, is equipped with a wedge bevel on the back.

The brake lining support 10 is clearly visible here. It is a block composed of a weldable material, usually steel. In this case, a structural steel can be used. Preferably, an alloyed steel is used, in particular a chromium steel or chromium manganese steel. Such a steel is more available to the surface-layer welding of a high-alloyed or super-alloyed material. It is advantageously possible, for example, to use the quality 16 MnCrS5.

The brake lining support 10 has a number of welding beads 11 provided on it, which each have a longitudinal axis 1, and constitute the brake lining. In the present, preferred case, six welding beads spaced apart from one another are provided. These are welding beads in the narrower sense. Preferably, at least 30% of the surface of the brake lining support 10 serving as a substrate for the welding beads remains uncovered. Preferably, the longitudinal axes of the welding beads extend in parallel fashion, (completely or at least essentially) in the travel direction of the elevator car with proper installation of the brake blocks, it is possible for them to extend in a transverse direction or even at 90° to the travel direction, but this is not preferable for effectiveness reasons.

The longitudinal axes L of the welding beads 11 preferably extend parallel to one another. The welding beads preferably all have an identical geometrical form. These welding beads 11 constitute the actual brake lining, which, because of the welding, is permanently connected to the brake lining support 10. It is important that during a braking or catching operation, only the surface of the welding beads 11 comes directly into contact with the surface of the guide rail.

As is very clear from FIG. 8, on their side oriented away from the brake lining support 10, the welding beads have a convex circumferential surface, preferably a circumferential surface that (at least essentially) corresponds to a semi-cylinder a semi-ellipse, or a semi-oval. In the present exemplary embodiment, which can, however, be generalized as a useful option, semi-cylinders are provided, whose circumference surface has a radius R, which is described by the following equation: 0.6 mm<R<2.1 mm. The permissible tolerance for the cylindricity along the circumference direction should be +/−0.15 min; it is conceivable for there to be a tolerance of up to +/−0.25 mm.

The preferred width of a brake block perpendicular to the travel direction when properly installed lies between 15 and 45 mm. Its thickness perpendicular to the rail surface or braking rail surface serving as a braking partner is usually less than this.

Adjacent welding beads ideally do not touch, but are instead spaced apart from one another by a minimum distance A, which is at least 0.5 times, or better still at least 0.8 times, the maximum span of a welding bead perpendicular to its longitudinal axis L. Two directly adjacent welding beads should if possible not be spaced apart by wider than a distance A, which corresponds to 1.5 times the maximum span of a welding bead perpendicular to its longitudinal axis. The spacing of the welding beads helps in the removal of the finer and coarser wear debris. The risk that metal particles that have been abraded/torn off as part of the cold welding process will nevertheless remain for a longer time between the surfaces that are pressed against each other to produce the braking, will be carried along, will have pressure exerted on them, then once again briefly undergo cold welding and re-separation, and thus intensify the damage, is significantly reduced by means of this and by means of the shape of the welding beads—in the region of the welding beads, only a narrow, linear contact occurs between the friction partners so that wear debris and particles is/are forced along the shortest path toward the left and/or right into the respective open space between adjacent welding beads and then removed from the brake contact zone. This also explains the extraordinary, surprising performance of the welding beads according to the invention.

It also appears to be the case that by being divided into individual beads spaced apart from one another, the brake lining is better able to adapt to the inevitable crowning of the guide rail surface or braking rail surface serving as a friction partner.

The welding beads preferably have a width a of at least 2.2 mm. It is advantageous if the bead's apex protrudes or is raised by a height b of at least 1 mm from the surface of the brake lining support 10 that serves as the substrate for the surface-layer welding. The distance x between the two center lines of two directly adjacent welding beads preferably lies in the range between 3 and 10 mm, or better still between 3 and 7 mm.

It is particularly advantageous if the welding beads are spaced apart in the direction perpendicular to their longitudinal axis L so that they form a symmetrical pattern on the brake lining support or, even better, so that all directly adjacent welding beads are spaced the same distance x apart from one another, see FIG. 8.

Figure 11:
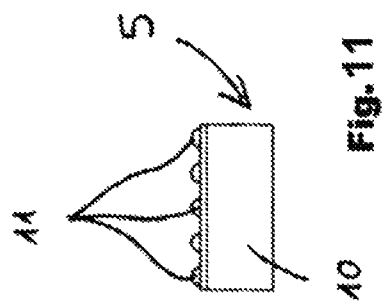
FIG. 11 shows the brake block according to FIG. 9 from the front.
Figure 9:
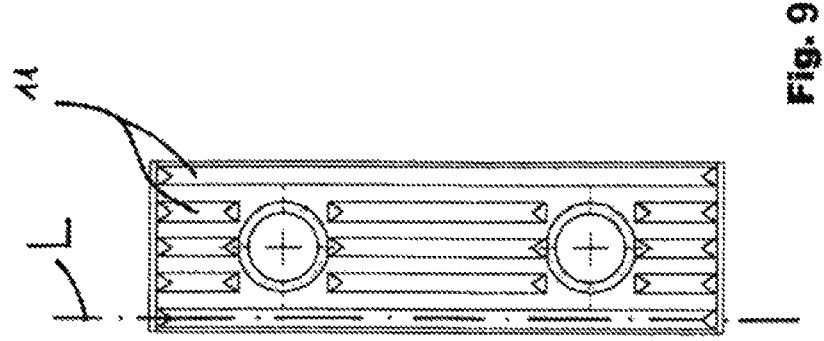
FIG. 9 shows a top view of the first brake block serving as a support.

FIGS. 9 through 11 show the second brake block 5. Provided that nothing to the contrary is described below, that which has been said in connection with the first brake block applies analogously to this second brake block.

It is worth noting that this brake block, in the region of its left and right outer edges, has respective continuous welding beads extending over its entire length. Between these beads, a plurality of welding beads are provided, preferably 3 or 4 rows of them, which are interrupted in the direction of their longitudinal axis L by an opening, preferably provided with a thread, for fastening; this second brake block 5 to the brake caliper 1.

Particularly Preferred Materials

For practical implementation of the invention through production of corresponding welding beads, the materials listed below have turned out to be particularly well suited:

| No. | Material | Characteristics |
| --- | --- | --- |
| #1 | WC 40 (NiCrBSi) | Carbide integrated into a metallic matrix |
| #2 | Fe 12 Ni 17 Cr 2.5 Mo 2.3 Si 1 Mn 0.03 C | Iron-based alloy |
| #3 | Ni 15 Cr 16 Mo 5 Fe 4 W | Nickel-based alloy |
| #4 | Ni 21.5 Cr 8.5 Mo 3.5 Nb 3 Fe | Nickel-based alloy |
| #5 | Ni 19 Cr 18 Fe 3 Mo 0.5 Al 5 Nb 1 Ti 0.05 C | Nickel-based alloy |
| #6 | Co 28 Cr 4 W 3 Ni 3 Fe 1.5 Si 1 C 1 Mo | Cobalt-based alloy |
| #7 | Co 27 Cr 5.5 Mo 3 Ni 0.25 C | Cobalt-based alloy |
| #8 | Co 25 Cr 5 Mo 2.5 W 2 Ni | Cobalt-based alloy |
| #9 | W 3.5 C | Tungsten-based carbide |

Comparative Tests

Using these materials, first and second brake blocks of the indicated type were produced, which were provided with five welding beads completely spaced apart from one another in the direction perpendicular to their longitudinal axes L. The welding beads had a width of approximately 4 mm and a contour in the form of a semi-cylindrical shell. Two directly adjacent rows were spaced apart from each other by a distance A of about 3 mm. The apex of each of the welding beads protruded by approximately 2 mm from the surface of the brake lining support serving as a substrate.

The welding beads were produced by means of surface-layer welding with the aid of a machine-guided welding laser. The raw material from which the welding seams were melted was supplied in powdered form. The resulting surface roughness was similar to that of a "porous" surface produced using sand casting; this is not obligatory, but has turned out to be advantageous. Their surface roughness when new was preferably Rz>20, or better still Rz>50. It is assumed that this surface roughness is responsible for the above-explained wearing-in, i.e. the wear that is pronounced at least in the first braking operation and then levels off significantly.

These brake blocks were installed in a progressive safety gear of the type mentioned at the beginning; then the catching of the elevator car was triggered repeatedly and after each catching operation, the integrity of the brake blocks or their brake linings was checked.

For comparison purposes, corresponding traditional brake blocks were used, which were made of a steel whose surface was uniformly hardened and therefore had a martensitic structure there. They were used to perform catching tests in the same way.

After the fourth catching operation, the brake blocks that were used exhibited pronounced evidence of local cold welding and subsequent re-separation, making it necessary to replace these brake blocks.

The brake blocks according to the invention all withstood at least 10 repeated catching operations without exhibiting any significant wear that would have made it necessary to replace the brake blocks.

Figure 12:
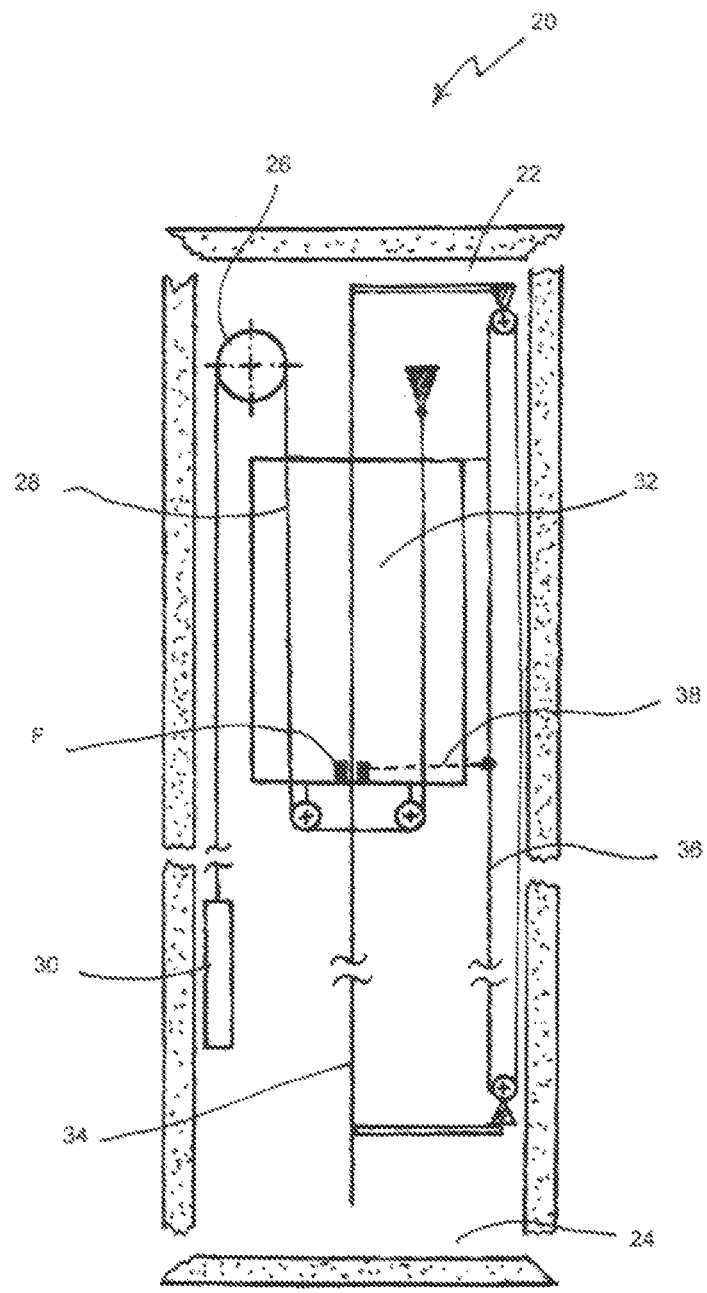
FIG. 12 is a diagram of an elevator system.

FIG. 12 is a diagram of an elevator system 20 including an elevator having progressive safety gear. The diagram gives an overview of the parts within an elevator system 20, including: a shaft head 22 at the top of the system, and a pit 24 at the bottom of the system 20; a motor with a traction sheave 26 around which a hoisting rope 28 operates, with a counter weight 30 attached to one end of the hoisting rope 28; an elevator car 32 is guided along a guide rail 34; and a speed limiter rope 36 works in combination with a lever 38 of the speed limiter for actuating the brake mechanism and/or safety gear F. The brake mechanism and/or safety gear F is shown in greater detail in FIGS. 1-11.

The invention claimed is:

1. An elevator system, comprising:
an elevator car;
elevator car guide rails, at least one of the guide rails functioning as a braking rail; and
a brake mechanism and/or safety gear having at least one brake block that cooperates with the braking rail to slow or halt movement of the elevator car, wherein an active surface of the brake block that comes into contact with the braking rail functions as a brake lining and includes at least one longitudinally-extending welding bead whose surface hardness is greater than a surface hardness of the braking rail, and wherein an apex of the at least one welding bead protrudes by more than 0.5 mm from a surface of a brake lining support.

2. The elevator system according to claim 1, wherein the brake lining of the brake block is composed of at least two welding beads spaced apart from each other.

3. The elevator system according to claim 1, wherein the at least one welding bead has a semicircular, semi-elliptical, or semi-oval cross-section perpendicular to a longitudinal axis of the at least one welding bead.

4. The elevator system according to claim 1, wherein the at least one welding bead is free of scale.

5. The elevator system according to claim 1, wherein the surface of the at least one welding bead is not remachined, is not ground, and also has not been subjected to any subsequent heat treatment.

6. The elevator system according to claim 1, wherein the at least one welding bead contains carbide.

7. The elevator system according to claim 1, wherein the at least one welding bead is composed of at least one of the group consisting of: a nickel-based alloy, a cobalt-based alloy, and an iron-based alloy.

8. The elevator system according to claim 1, wherein the at least one welding bead is composed of at least one of the group consisting of: a nickel-based alloy, a cobalt-based alloy, a chromium-based alloy, a tungsten carbide alloy, and a high-alloyed steel.

9. The elevator system according to claim 1, wherein the at least one welding bead is composed of a material that has at least three different alloying components.

10. The elevator system according to claim 1, wherein the at least one welding bead contains at least 10 wt % of Cr.

11. The elevator system according to claim 1, wherein the at least one welding bead contains at least 10 wt % of Ni.

12. The elevator system according to claim 1, wherein the at least one welding bead contains at least 5 wt % of Mo.

13. The elevator system according to claim 1, wherein the at least one welding bead contains at least 2 wt % and at most 8 wt % W.

14. The elevator system according to claim 1, wherein the at least one welding bead is melted from a powder.

15. The elevator system according to claim 1, wherein a structure of the at least one welding bead has been produced by laser surface-layer welding.

16. A method for manufacturing the elevator brake block in the elevator system of claim 1, comprising:
welding at least two longitudinally-extending, spaced-apart welding beads on a brake lining support composed of a weldable, low-alloyed steel, wherein the at least two welding beads constitute a brake lining that is brought into frictional contact with a braking rail during operation.

17. The method according to claim 16, comprising producing the welding beads by laser surface-layer welding using a metal powder.

18. The elevator system according to claim 1, wherein the brake lining of the brake block is composed of three to ten welding beads spaced apart from one another.

19. The elevator system according to claim 1, wherein the at least one welding bead is composed of a material that has at least three different alloying components and is composed of a nickel-based or cobalt-based super alloy, which is alloyed with a plurality of the following elements: Co, Ni, Fe, Cr, Mo, W, Re, Ru, Ta, Nb, Al, Ti, Mn, Zr, C and B.

* * * * *